United States Patent
Tanaka et al.

(10) Patent No.: US 7,519,174 B2
(45) Date of Patent: Apr. 14, 2009

(54) COMMUNICATION TERMINAL WITH CASING CONDUCTORS FOR REDUCING ANTENNA GAIN DEGRADATION

(75) Inventors: Nobuaki Tanaka, Yokohama (JP); Kenji Sato, Yokohama (JP); Eiji Saito, Yokohama (JP)

(73) Assignee: Panasonic Corporation, Osaka (JP)

( * ) Notice: Subject to any disclaimer, the term of this patent is extended or adjusted under 35 U.S.C. 154(b) by 239 days.

(21) Appl. No.: 10/534,153
(22) PCT Filed: Nov. 7, 2003
(86) PCT No.: PCT/JP03/14223

§ 371 (c)(1),
(2), (4) Date: Jun. 16, 2005

(87) PCT Pub. No.: WO2004/042947

PCT Pub. Date: May 21, 2004

(65) Prior Publication Data

US 2006/0017625 A1 Jan. 26, 2006

(30) Foreign Application Priority Data

Nov. 7, 2002 (JP) ............................ 2002-324084

(51) Int. Cl.
*H04M 1/00* (2006.01)
*H04M 9/00* (2006.01)
*H05K 9/00* (2006.01)

(52) U.S. Cl. ...................... 379/419; 379/429; 361/816; 455/575.5

(58) Field of Classification Search ................ 379/419, 379/428.01; 455/575.1–575.9; 343/702; 361/816, 814

See application file for complete search history.

(56) References Cited

U.S. PATENT DOCUMENTS 5,731,964 A * 3/1998 Kitakubo et al. ............ 361/816

6,266,019 B1 * 7/2001 Stewart et al. .............. 343/702

(Continued)

FOREIGN PATENT DOCUMENTS

JP 62161410 10/1987

(Continued)

OTHER PUBLICATIONS

Japanese Office action dated Mar. 26, 2008 with English translation.
Japenese Office Action, Sep. 3, 2008.
Korean Office Action, Oct. 6, 2008.

*Primary Examiner*—Curtis Kuntz
*Assistant Examiner*—Phylesha Dabney
(74) *Attorney, Agent, or Firm*—Pearne & Gordon LLP (57) ABSTRACT

An object of the invention is to provide a communication terminal capable of keeping the reception sensitivity good if the communication terminal is placed on a metal plate with the communication terminal laid on its side without the need for changing the size or the design of the main body of the communication terminal. A board (125) to which an antenna (107) is connected is provided inside a lower casing (105). The board (125) is provided with a GND plane to which a radiating element (121) is connected. An auxiliary bottom board (123) is joined to the radiating element (121) in a roughly perpendicular direction thereto. The radiating element (121) and the auxiliary bottom board (123) are conductors. A high-frequency current (131) flows into the board (125). Since a high-frequency current (133) of an opposite phase flows through a metal plate (141) because of the mirror image effect in a state in which the communication terminal is placed on the metal plate (141), the high-frequency current (131) is canceled and the radiation of the antenna (107) is weakened. However, the components perpendicular to the metal plate (141) do not cancel each other because of the mirror image effect and thus the radiating element (121) forms a dipole antenna symmetrically with the metal plate (141).

14 Claims, 11 Drawing Sheets

U.S. PATENT DOCUMENTS

| | | | |
|---|---|---|---|
| 6,754,507 B2 * | 6/2004 | Takagi | 455/550.1 |
| 7,010,334 B2 * | 3/2006 | Saito | 455/575.7 |
| 7,082,322 B2 * | 7/2006 | Harano | 455/575.1 |
| 7,136,681 B2 * | 11/2006 | Sadler et al. | 455/575.1 |
| 7,228,112 B2 * | 6/2007 | Ota et al. | 455/90.3 |
| 7,269,393 B2 * | 9/2007 | Ota et al. | 455/90.3 |

FOREIGN PATENT DOCUMENTS

| | | |
|---|---|---|
| JP | 9-18220 | 1/1997 |
| JP | 9-83241 | 3/1997 |
| JP | 10-126304 | 5/1998 |
| JP | 10256819 | 9/1998 |
| JP | 2002009521 A | 1/2000 |
| JP | 2000-49520 A | 2/2000 |
| JP | 2000-049520 A | 2/2000 |
| JP | 2000-315905 | 11/2000 |
| JP | 2000315905 | 11/2000 |
| JP | 2001217641 A | 8/2001 |
| JP | 2002-50914 | 2/2002 |
| JP | 2002-064314 A | 2/2002 |
| JP | 2002050914 | 2/2002 |
| JP | 2002-094311 A | 3/2002 |
| JP | 2002-353719 A | 12/2002 |
| JP | 2003-060417 A | 2/2003 |
| JP | 2003-283238 A | 10/2003 |
| JP | 2003-347815 A | 12/2003 |
| JP | 2004-032808 A | 1/2004 |
| JP | 2005-522063 A | 7/2005 |
| JP | 2005-286895 A | 10/2005 |

* cited by examiner

COMMUNICATION TERMINAL WITH CASING CONDUCTORS FOR REDUCING ANTENNA GAIN DEGRADATION

TECHNICAL FIELD

This invention relates to a communication terminal and in particular to a communication terminal capable of keeping the reception sensitivity good if the communication terminal is placed on a metal plate of a steel desk, etc., in a state in which the communication terminal is laid on its side.

BACKGROUND ART

Usually, a communication terminal such as a mobile telephone or a PHS is provided with an antenna. If the communication terminal is placed on a metal plate of a steel desk, etc., with the communication terminal laid on its side, the antenna is brought close to the metal plate and thus interconnection occurs and a current of an opposite phase to the current flowing through the antenna flows into the metal face, changing the radiation directivity of the antenna and largely changing the impedance characteristic. Thus, the matching state comes undone and the antenna gain is degraded; this is a problem.

Figure 9:
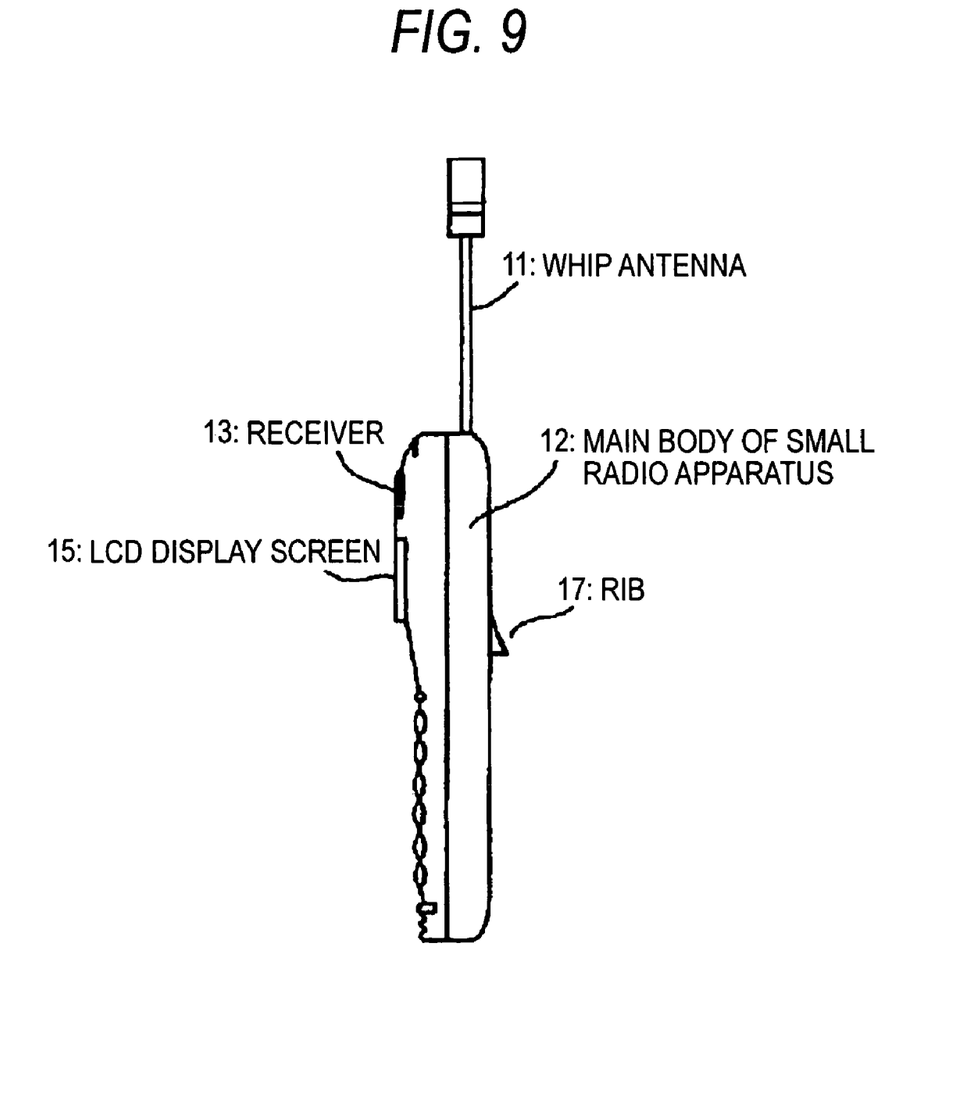
FIG. 9 is a side view to show the configuration of a small radio described in JP-A-10-126304.

To solve this problem, a small radio described in JP-A-10-126304 (patent document 1) is provided with a whip antenna in the upper part of the rear and thus a rib for adjusting the reception sensitivity of the whip antenna is installed at a balanced position so that the upper side of the main body of the small radio floats when the main body of the small radio is laid on its side, as shown in FIG. 9. Accordingly, if the small radio is placed on a metal plate, the antenna gain is not degraded and good reception sensitivity can be realized.

As an alternative method, a technique of switching an antenna element and a matching circuit by a switching element for impedance matching on a metal plate or a technique of providing a subantenna for also radiating on a metal plate is available.

(Patent Document 1) JP-A-10-126304

However, in the technique of installing the rib at the rear of the small radio described above, the thickness of the main body increases as much as the rib thickness and thus the small radio cannot be slimmed and the rib gives a large impact from the aspect of the design and thus the outward shape is impaired; this is a problem. In the technique switching of an antenna element and a matching circuit by a switching element or the technique of providing a subantenna, the circuit configuration and control become complicated and the cost increases and in addition, the technique is also undesirable for miniaturization. Thus, a communication terminal for suppressing degradation of the antenna gain if the main body of the communication terminal is placed on a metal plate with the main body laid on its side without the need for changing the size, the design, etc., of the terminal is demanded.

The invention is embodied in view of the problems in the related art and the demand described above and it is an object of the invention to provide a communication terminal capable of keeping the reception sensitivity good if the communication terminal is placed on a metal plate with the communication terminal laid on its side without the need for changing the size or the design of the main body of the communication terminal.

DISCLOSURE OF THE INVENTION

To accomplish the above-mentioned object, a communication terminal according to the invention is a communication terminal including a board having a GND plane, the board to which an antenna is connected, inside a casing, the above-mentioned communication terminal including a first conductor part being formed of a conductor and placed inside the casing so that it is exposed from a rear of the casing or is along the rear of the casing; and a second conductor part being formed of a conductor and placed inside the casing so that it is exposed from a bottom face or a side of the casing or is along the bottom face or the side of the casing, wherein the above-mentioned second conductor part forms a perpendicular component with the above-mentioned first conductor part and is electrically connected to the GND plane of the board and the above-mentioned first conductor part.

A high-frequency current flows from the antenna to the board. Since a high-frequency current of an opposite phase flows through a metal plate because of the mirror image effect in a state in which the communication terminal is placed on the metal plate with the rear of the casing down, the high-frequency current flowing through the board of the communication terminal is canceled and thus the radiation of the antenna is weakened. In the state, the first conductor part is electrically connected to the metal plate or is short-circuited in a high-frequency manner to the metal plate and the second conductor part is connected to the GND of the board; the components perpendicular to the metal plate strengthen each other by the mirror image effect and thus the high-frequency current flowing through the top of the board flows into the second conductor part as an extension of the board, producing an electric field perpendicular to the metal plate. Thus, the antenna gain is not degraded and the reception sensitivity can be kept good. The first conductor part and the second conductor part can be installed with almost no need for changing the size or the design of the communication terminal.

In the communication terminal according to the invention, a passive element is provided between the above-mentioned second conductor part and the GND plane of the board, and the above-mentioned second conductor part is electrically connected to the GND plane of the board through the passive element.

The passive element is thus inserted between the second conductor part and the GND plane of the board, whereby the electric distribution of the second conductor part can be changed. Therefore, the resonance frequency of the second conductor part can be adjusted to any desired frequency in the presence of the passive element.

Further, a communication terminal according to the invention is a communication terminal including a board to which a shield case is attached on a rear of a casing and an antenna is connected inside the casing, the above-mentioned communication terminal including a first conductor part being formed of a conductor and placed inside the casing so that it is exposed from the rear of the casing or is along the rear of the casing; and a second conductor part being formed of a conductor and placed inside the casing, wherein the above-mentioned first conductor part and the above-mentioned second conductor part are placed between the rear of the casing and the board and wherein the above-mentioned second conductor part forms a perpendicular component with the above-mentioned first conductor part and is electrically connected to the shield case attached to the board and the above-mentioned first conductor part.

A high-frequency current flows from the antenna to the board. Since a high-frequency current of an opposite phase flows through a metal plate because of the mirror image effect in a state in which the communication terminal is placed on the metal plate with the rear of the casing down, the high-frequency current flowing through the board of the communication terminal is canceled and thus the radiation of the antenna is weakened. In the state, the first conductor part is electrically connected to the metal plate or is short-circuited in a high-frequency manner to the metal plate and the second conductor part is connected to the shield case attached to the board; the components perpendicular to the metal plate strengthen each other by the mirror image effect and thus the high-frequency current flowing through the top of the board flows into the second conductor part as an extension of the board, producing an electric field perpendicular to the metal plate. Thus, the antenna gain is not degraded and the reception sensitivity can be kept good. If the length of the board cannot be taken to the vicinity of the bottom face of the casing because of the positional relationship with other parts, the first conductor part and the second conductor part can be formed. The first conductor part and the second conductor part can be installed with almost no need for changing the size or the design of the communication terminal.

Further, preferably in the communication terminal according to the invention, the above-mentioned first conductor part and the above-mentioned second conductor part are integrally formed in one piece.

In the figures, numeral 101 denotes a hinge, numeral 103 denotes an upper casing, numeral 105 denotes a lower casing, numeral 107 denotes an antenna, numeral 121, 153, 203, 305 denotes a radiation element, numeral 123, 155, 205, 307 denotes an auxiliary bottom board, numeral 201 denotes a metal fitting, and numeral 303 denotes a shield case.

BEST MODE FOR CARRYING OUT THE INVENTION

Embodiments of communication terminals according to the invention will be discussed in detail in the order of (First embodiment), (Second embodiment), and (Third embodiment) with reference to the accompanying drawings. Each communication terminal described below is a folding communication machine such as a mobile telephone or a PHS including an antenna. However, the communication terminal is not limited to the folding communication machine and may be a straight type or flip type communication machine.

First Embodiment

Figure 1:
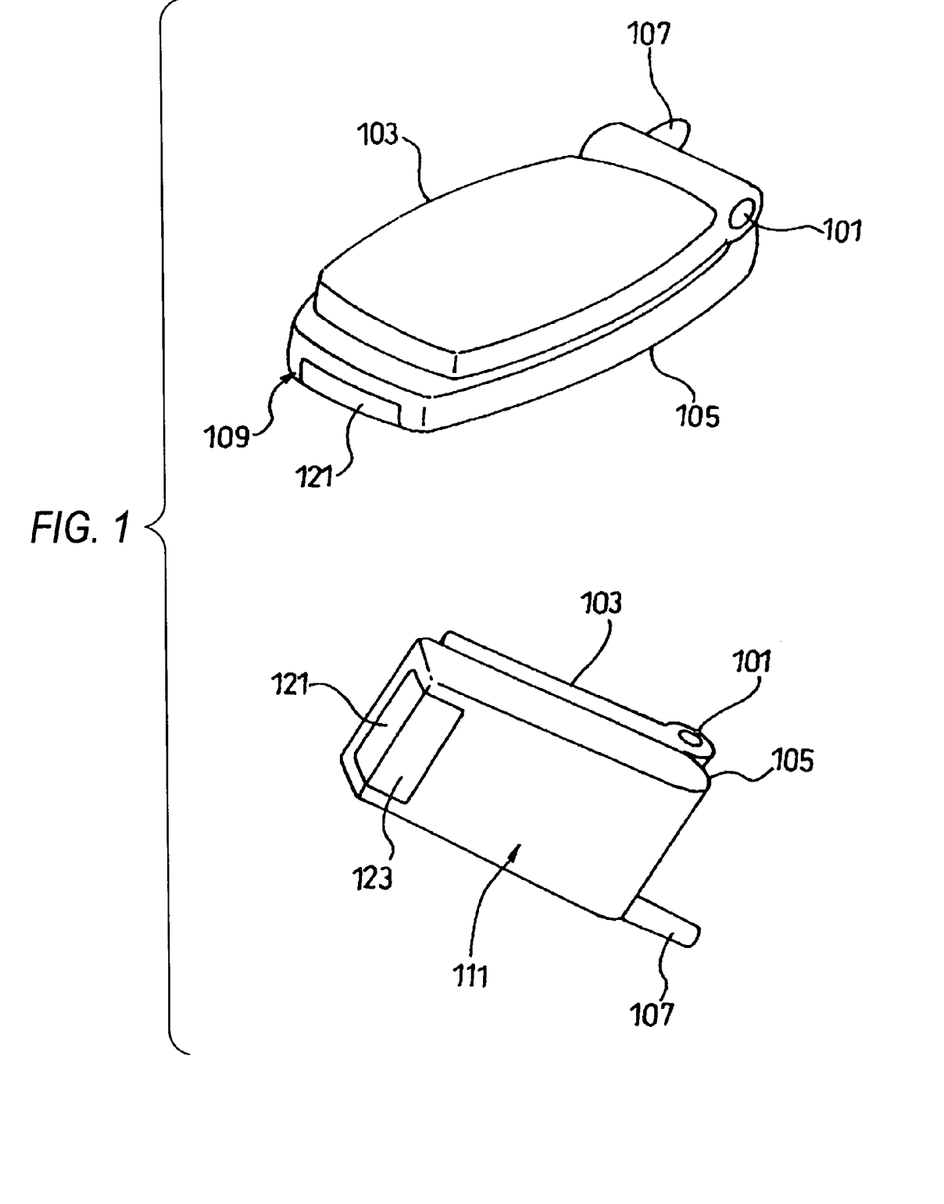
FIG. 1 is an external view to show communication terminals of a first embodiment.

FIG. 1 is an external view to show a communication terminal of a first embodiment. As shown in the figure, the communication terminal of the embodiment has two foldable casings (upper casing 103 and lower casing 105) joined by a hinge 101 and an antenna 107 installed on the lower casing 105. A bottom surface of the lower casing 105 denoted by numeral 109 in FIG. 1 and a rear denoted by numeral 111 are formed roughly at the right angle. A radiating element 121 corresponding to a second conductor part in claims is provided so that it is exposed flush with the bottom surface 109 of the lower casing 105, and an auxiliary bottom board 123 corresponding to a first conductor part is provided so that it is exposed flush with the rear 111 of the lower casing 105; the radiating element and the auxiliary bottom board are joined roughly at the right angle. The radiating element 121 and the auxiliary bottom board 123 are conductors.

Figure 2:
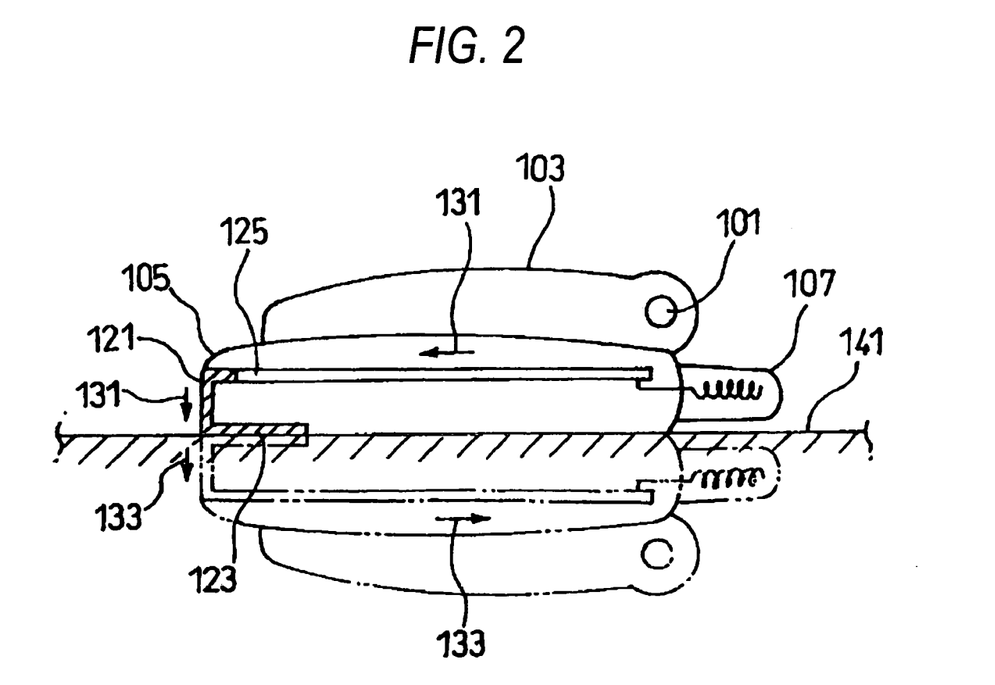
FIG. 2 is a schematic representation to schematically show the main part of the communication terminal of the first embodiment from a side.

The main part of the communication terminal of the embodiment will be discussed in detail with reference to FIG. 2. FIG. 2 is a schematic representation to schematically show the main part of the communication terminal of the first embodiment from a side. As shown in the figure, the lower casing 105 forming a part of the communication terminal of the embodiment is provided internally with a board 125 to which the antenna 107 is connected. Parts such as ICs, devices, and elements required for causing the communication terminal of the embodiment to operate as a communication machine are mounted on the board 125, and a GND plane (which will be hereinafter referred to as simply "GND") is also provided thereon. The radiating element 121 is connected to the GND of the board 125.

As shown in FIG. 2, a high-frequency current 131 flows from the antenna 107 to the board 125. Since a high-frequency current 133 of an opposite phase flows through a metal plate 141 because of the mirror image effect in a state in which the communication terminal of the embodiment is placed on the metal plate 141 of a steel desk, etc., with the lower casing 105 down, the high-frequency current 131 flowing through the board 125 is canceled. Thus, the essential radiation of the antenna 107 is weakened. In the state, the auxiliary bottom board 123 is electrically connected to the metal plate 141 and the radiating element 121 is connected to the GND of the board 125; the components perpendicular to the metal plate 141 strengthen each other by the mirror image effect and thus the high-frequency current 131 flowing through the top of the board 125 flows into the radiating element 121 as an extension of the board, producing an electric field perpendicular to the metal plate 141.

That is, the metal plate 141 and the auxiliary bottom board 123 are in electric contact with each other and thus are at the same potential, but the radiating element 121 is connected to the GND of the board 125 and the high-frequency current 131 from the antenna 107 flows into the GND of the board 125 and thus the high-frequency current 131 flows into the radiating element 121 as an extension of the board 125, whereby the radiating element 121 produces an electric field of polarization component perpendicular to the metal plate 141, contributing to radiation. If the auxiliary bottom board 123 is not provided, the terminal of the radiating element 121 facing the metal plate 141 cannot be short-circuited in a high-frequency manner relative to the metal plate 141 and a sufficient mirror image effect cannot be provided and thus the components perpendicular to the metal plate 141 do not strengthen each other and the radiating element 121 does not contribute to radiation.

If the communication terminal of the embodiment is placed on the metal plate 141, the radiating element 121 is only a part of the GND of the board 125 together with the auxiliary bottom board 123 and thus the characteristic of the antenna 107 is not adversely affected.

As described above, the communication terminal of the embodiment includes the radiating element 121 connected to the GND of the board 125 and the auxiliary bottom board 123 joined to the radiating element 121 roughly at the right angle, so that the auxiliary bottom board 123 is electrically connected to the metal plate 141 and the radiating element 121 radiates a vertical electric field to the metal plate 141 in a state in which the communication terminal is placed on the metal plate 141 with the communication terminal laid on its side. Thus, the antenna gain is not degraded and the reception sensitivity can be kept good.

Figure 3:
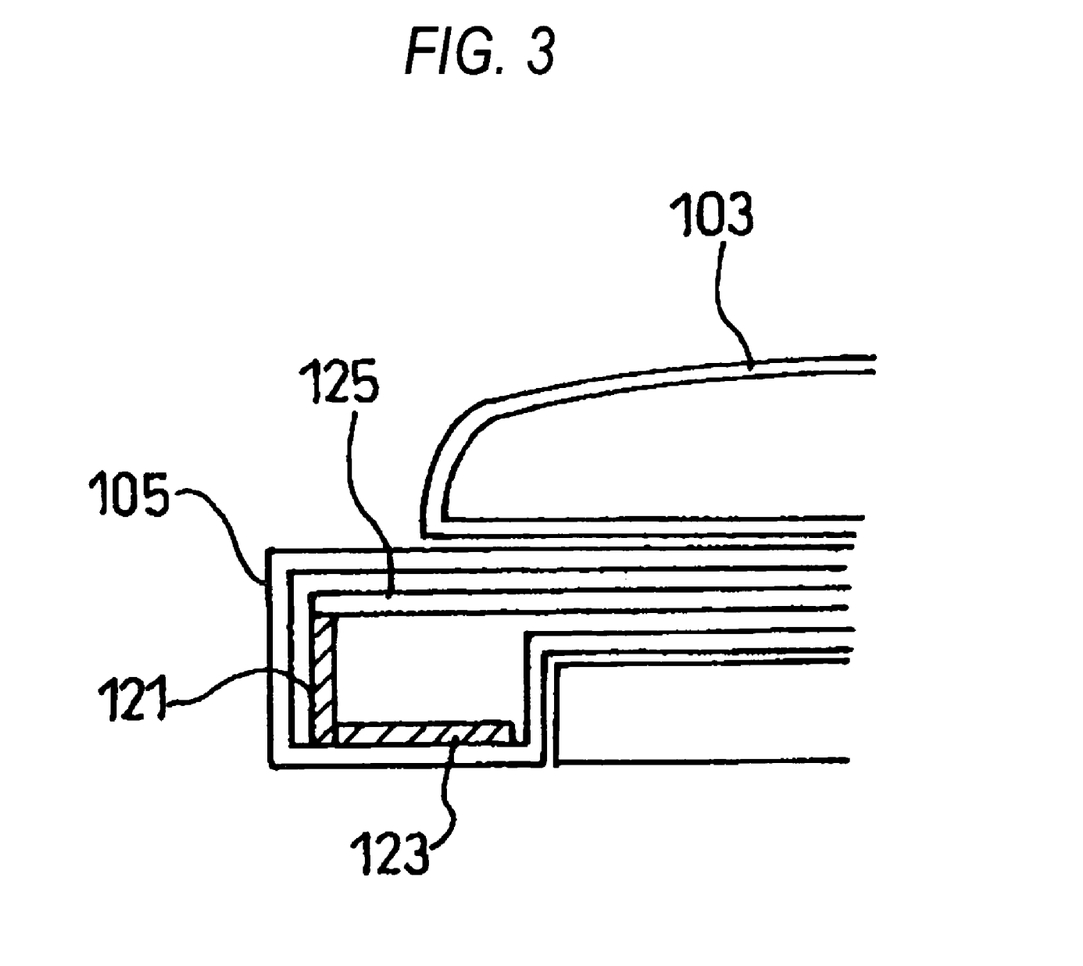
FIG. 3 is a schematic representation to schematically show the main part of a communication terminal of another embodiment from a side.

In the embodiment, the radiating element 121 and the auxiliary bottom board 123 are exposed flush with the surface of the lower casing 105, but while a similar positional relationship is held, they may be provided inside the lower casing 105, as shown in FIG. 3. In this case, the radiating element 121 and the auxiliary bottom board 123 are not exposed, so that the design of the communication terminal is not impaired and complicating the shape of the lower casing 105 can be prevented. When the communication terminal is placed on the metal plate 141, the auxiliary bottom board 123 forms a capacitor together with the metal plate 141 and thus becomes short-circuited in a high-frequency manner. Therefore, the radiating element 121 radiates an electric field of polarization component perpendicular to the metal plate 141 by the mirror image effect.

Figure 4:
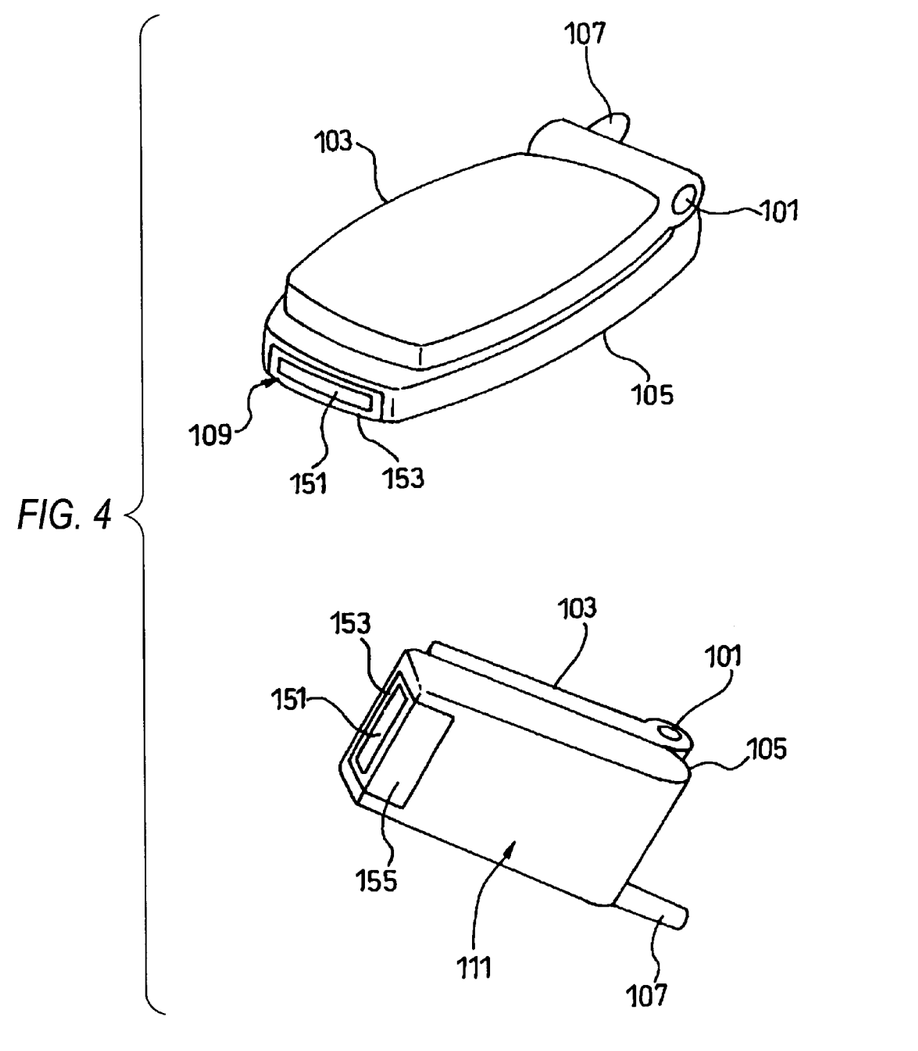
FIG. 4 is an external view to show communication terminals of another embodiment.

If parts 151 of a connector, a jack, etc., are provided on the bottom face 109 of the lower casing 105, the lower casing 105 may be shaped so that a radiating element 153 is exposed from the peripheral portion of the parts 151, as shown in FIG. 4. In the embodiment, the radiating element 153 and an auxiliary bottom board 155 are formed as separate bodies and are joined, but may be formed in one piece.

However, preferably each area of the auxiliary bottom board 123 shown in FIGS. 2 and 3 and the auxiliary bottom board 155 shown in FIG. 4 is 20 square millimeters or more as the minimum required area to short-circuit in a high-frequency manner to the metal plate 141.

Second Embodiment

Figure 5:
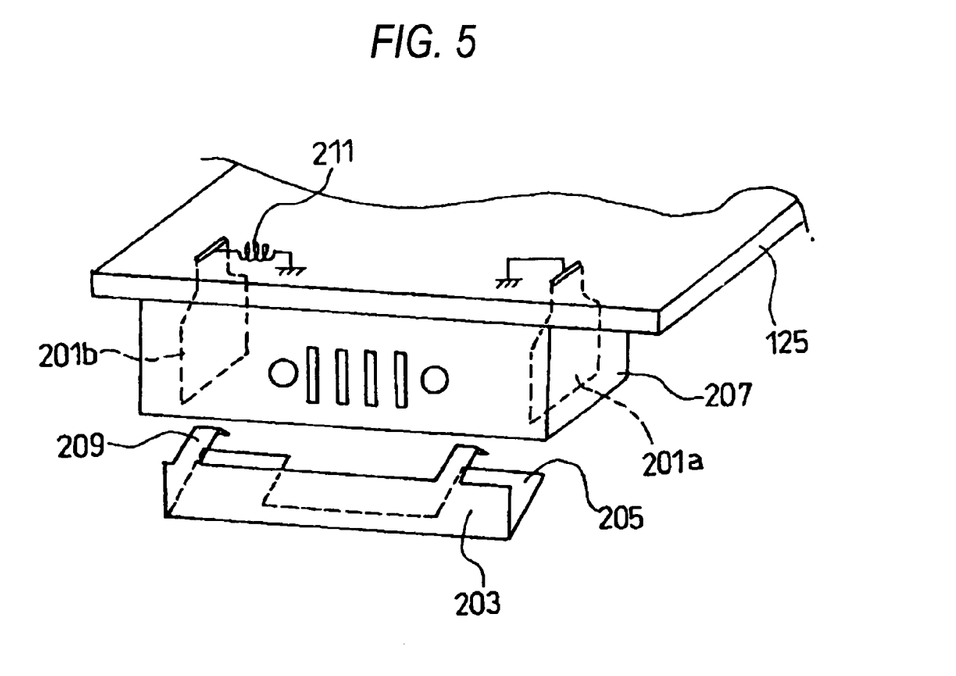
FIG. 5 is a schematic representation to schematically show the main part of a communication terminal of a second embodiment from a bottom face.
Figure 6:
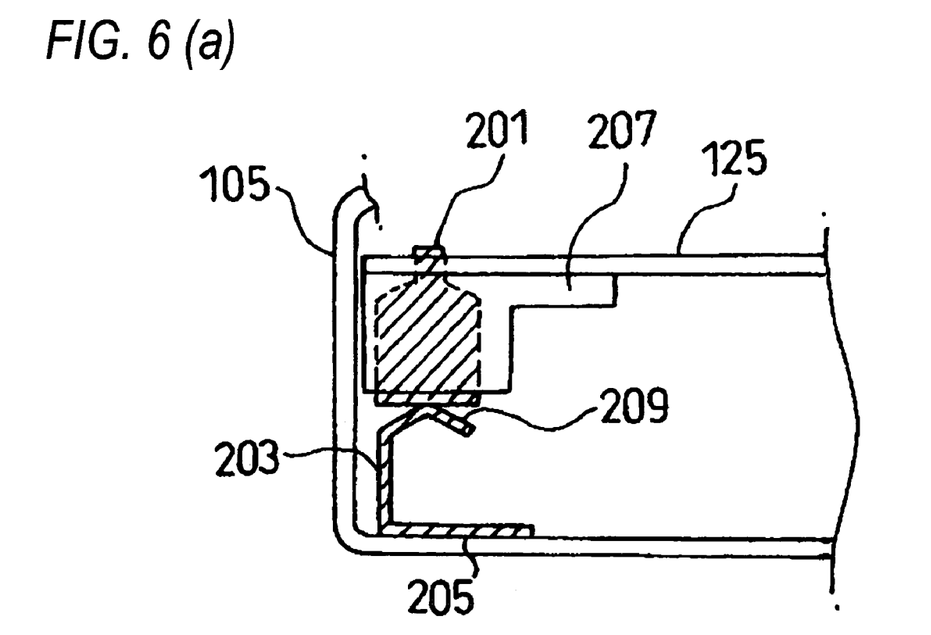
FIG. 6 is a schematic representation to schematically show the communication terminal of the second embodiment from a side (a) and from a rear (b)

FIG. 5 is a schematic representation to schematically show the main part of a communication terminal of a second embodiment from a bottom face. FIG. 6 is a schematic representation to schematically show the communication terminal of the second embodiment from a side (a) and from a rear (b). Parts identical with those in FIGS. 1 and 2 (first embodiment) are denoted by the same reference numerals in FIGS. 5 and 6.

The communication terminal of the second embodiment is provided with a board 125, metal fittings 201, a radiating element 203, and an auxiliary bottom board 205 inside a lower casing 105, as shown in FIGS. 5 and 6. The radiating element 203 and the auxiliary bottom board 205 are formed in one piece. The metal fittings 201 are fittings for fixing parts 207 of a connector, a jack, etc., to the board 125 and are electrically connected to GND of the board 125. Further, the radiating element 203 is provided with roof-type spring parts 209 to come in contact with the metal fittings 201, and the radiating element 203 and the auxiliary bottom board 205 are electrically connected to the GND of the board 125 through the metal fittings 201. However, not only the contact of the spring parts 209 is used, but also the metal fittings 201, the radiating element 203, and the auxiliary bottom board 205 may be formed in one piece.

Thus, even with the communication terminal provided with the connector 207 fixed to the board 125 by the metal fitting 201, the radiating element 203 and the auxiliary bottom board 205 can be installed in a narrow space below the parts 207 and can be electrically connected to the GND of the board 125 through the metal fittings 201, so that similar advantages to those of the first embodiment can be provided. That is, the current components perpendicular to a metal plate strengthen each other by the mirror image effect even in a state in which the communication terminal is placed on the metal plate and thus the high-frequency current flowing through the top of the board 125 flows into the radiating element 203 and the metal fittings 201 as an extension of the board, radiating an electric field of polarization component perpendicular to the metal plate. Thus, the antenna gain is not degraded and the reception sensitivity can be kept good.

As shown in FIG. 5, since the metal fittings 201 are provided each on each side of the parts 207, one metal fitting 201a may be connected directly to the GND of the board 125 and the other metal fitting 201b may be connected through a passive element (for example, an element having an L component) 211 to the GND of the board 125. The passive element 211 is thus inserted between either metal fitting 201a or 201b and the radiating element 203, whereby the electric distribution of the radiating element 203 and the metal fitting 201 can be changed.

Therefore, if a necessary area for the auxiliary bottom board 205 to be short-circuited in a high-frequency manner to the metal plate cannot be provided for the reason of the rear space of the lower casing 105, the resonance frequency of the radiating element provided by the radiating element 203 and the metal fitting 201 can be adjusted to any desired frequency in the presence of the passive element 211. Consequently, the dipole antenna can radiate an electromagnetic wave of any desired frequency. However, preferably the area of the auxiliary bottom board 205 is 20 square millimeters or more as the minimum required area to short-circuit in a high-frequency manner to the metal plate.

Third Embodiment

Figure 7:
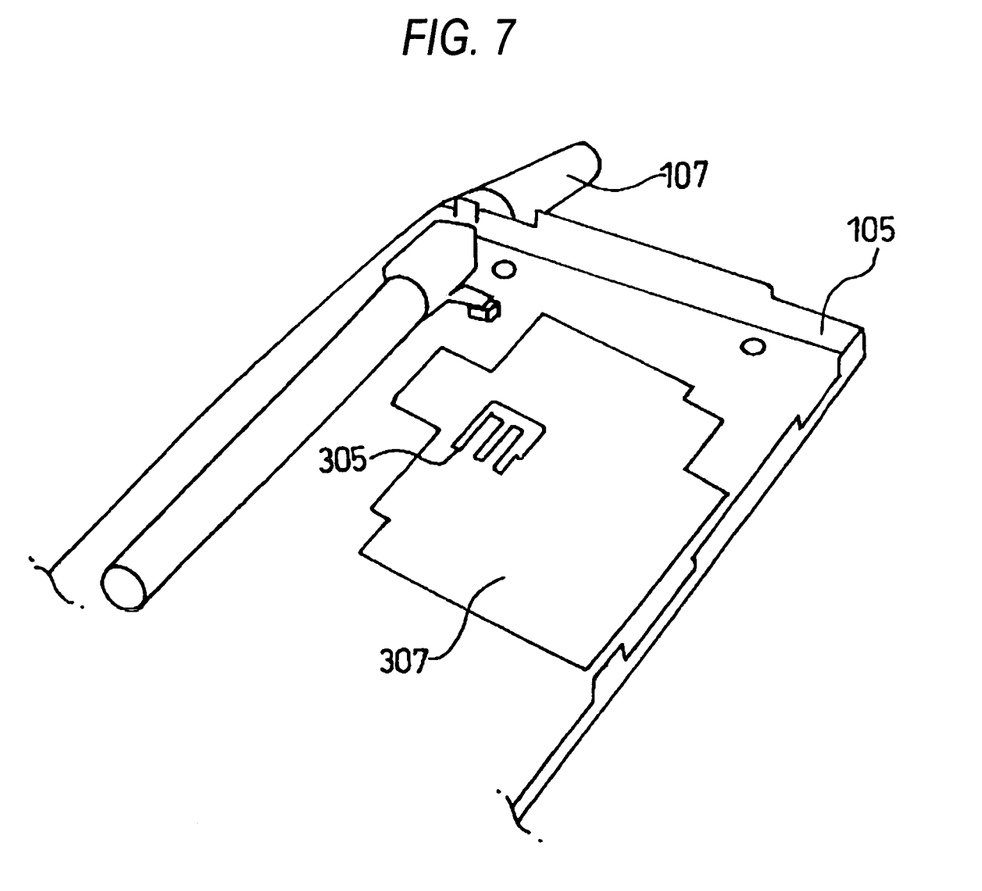
FIG. 7 is an external view to show a state in which a rear cover of a lower casing of a communication terminal of a third embodiment is removed from the rear.
Figure 8:
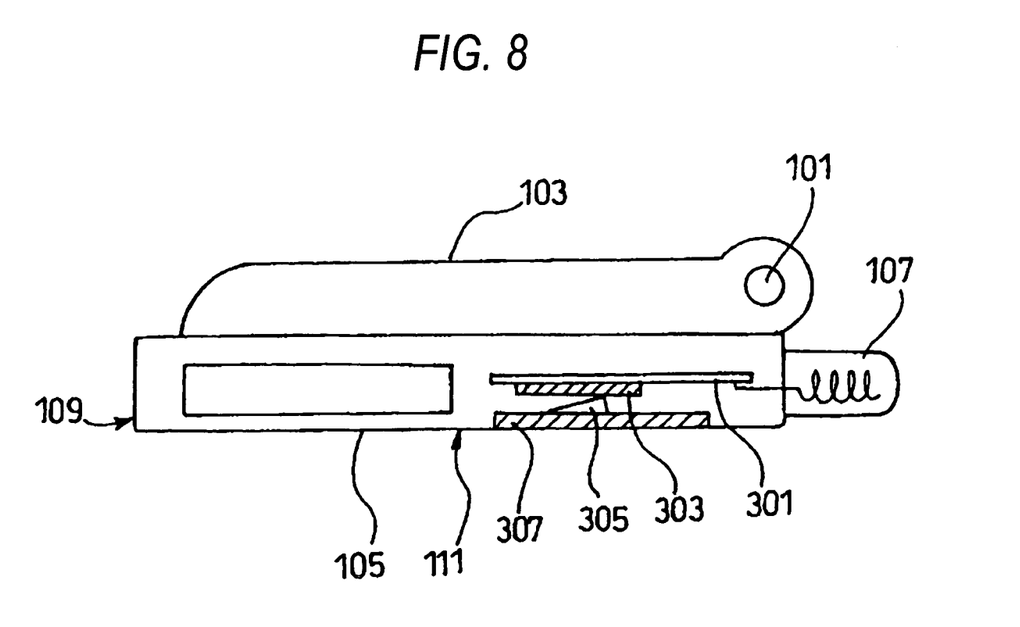
FIG. 8 is a schematic representation to schematically show the main part of the communication terminal of the third embodiment from a side.

FIG. 7 is an external view to show a state in which a rear cover of a lower casing of a communication terminal of a third embodiment is removed from the rear. FIG. 8 is a schematic representation to schematically show the main part of the communication terminal of the third embodiment from a side. Parts identical with those in FIGS. 1 and 2 (first embodiment) are denoted by the same reference numerals in FIGS. 7 and 8.

The communication terminal of the third embodiment is provided with a board 301, a shield case 303 attached to the rear of the board 301, a radiating element 305, and an auxiliary bottom board 307 inside a lower casing 105, as shown in FIGS. 7 and 8. The radiating element 305 and the auxiliary bottom board 307 are formed in one piece on the rear of the lower casing 105 of the board 301. The radiating element 305 is formed in such a manner that a part of the auxiliary bottom board 307 is lifted up from the rear and is pressed against the shield case 303. Therefore, the shield case 303 and the radiating element 305 are electrically connected in a state in which the board 301 with the shield case 303, the radiating element 305, and the auxiliary bottom board 307 are installed inside the lower casing 105.

Therefore, when the communication terminal of the embodiment is placed on a metal plate, the auxiliary bottom board 307 forms a capacitor together with the metal plate and thus becomes short-circuited in a high-frequency manner. Therefore, the high-frequency current flowing through the top of the board 301 flows into the radiating element 305 as an extension of the board 301 by the mirror image effect, and the radiating element 305 radiates an electric field of polarization component perpendicular to the metal plate. Thus, the essential radiation of the antenna 107 is weakened as the communication terminal is placed on the metal plate, but the radiating element 305 contributes to the radiation and thus the antenna gain is not degraded and the reception sensitivity can be kept good.

Since the amplitude of the high-frequency current flowing through the board 301 also varies depending on the position on the board 301, the electric distribution of the radiating element 305 can be changed by properly selecting the position of the point at which the radiating element 305 comes in contact with the shield case 303. Therefore, the resonance frequency of the radiating element 305 can be set to any desired frequency, so that the radiating element 305 can radiate an electromagnetic wave of any desired frequency.

As described above, in the communication terminal of the embodiment, if the length of the board 301 cannot be taken to the vicinity of a bottom face 109 of the lower casing 105 because of the positional relationship of a battery, etc., the radiating element 305 and the auxiliary bottom board 307 can be formed. Therefore, in a state in which the communication terminal is placed on a metal plate with the communication terminal laid on its side, the auxiliary bottom board 305 is short-circuited to the metal plate in a high-frequency manner and the high-frequency current on the top of the board 301 flows into the radiating element 305 as an extension of the board 301, radiating an electric field of polarization component perpendicular to the metal plate. Thus, the antenna gain is not degraded and the reception sensitivity can be kept good. The contact point between the radiating element 305 and the shield case 303 is set to an appropriate position on the board 301, whereby radiation from the radiating element 305 can be accomplished at any desired frequency.

In the embodiment, the auxiliary bottom board 307 is provided inside the lower casing 105, but may be provided so that it is exposed flush with a rear 111 of the lower casing 105. The shape of the radiating element 305 is not limited to the example shown in the figure and may be any if perpendicular component with the auxiliary bottom board 307 is formed. However, preferably the area of the auxiliary bottom board 307 is 20 square millimeters or more as the minimum required area to short-circuit in a high-frequency manner to the metal plate.

EXAMPLES

The advantages provided by the communication terminals according to the first to third embodiments described above will be discussed as compared with the advantages provided by communication terminals in related arts with reference to the drawings. Each communication terminal described below is a folding communication machine such as a mobile telephone or a PHS including an antenna. However, the communication terminal is not limited to the folding communication machine and may be a straight type or flip type communication machine.

Figure 10:
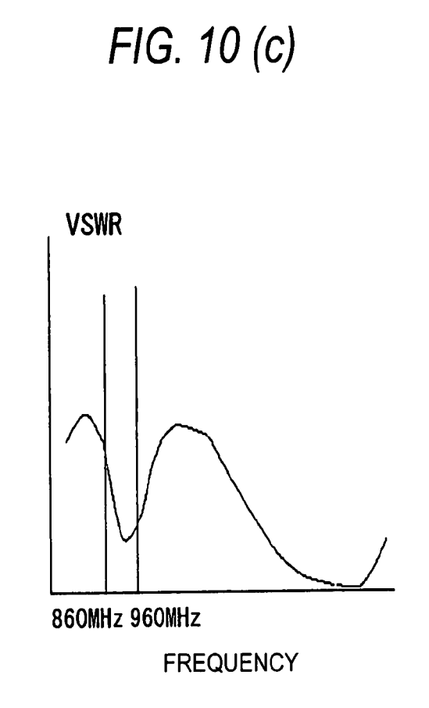
FIG. 10 is VSWR characteristic drawings provided by (a) communication terminal in related art, (b) the small radio in FIG. 9, and (c) the communication terminal of the embodiment.

FIG. 10 is VSWR characteristic drawings provided by (a) communication terminal in related art, (b) the small radio in FIG. 9, and (c) the communication terminal of the embodiment. VSWR (Voltage Standing Wave Radio) represents the ratio between peaks and valleys of a voltage amplitude distribution of a progressive wave and a reflected wave for interfering with each other for generating a standing wave. FIG. 10($a$) is a VSWR characteristic drawing of communication terminal in related art wherein the radiating element 121 and the auxiliary bottom board 123 are removed from the communication terminal of the first embodiment. FIG. 10($b$) is a VSWR characteristic drawing of the small radio shown in FIG. 9. FIG. 10($c$) is a VSWR characteristic drawing of the communication terminals of the first, second, and third embodiments.

As compared with the VSWR characteristic drawing of FIG. 10($a$), the VSWR characteristic drawing of FIG. 10($b$) shows that the VSWR value decreases a little in the band of 880 MHz to 960 MHz sandwiched between two lines in the figure. On the other hand, as compared with the VSWR characteristic drawings of FIG. 10($a$) and FIG. 10($b$), the VSWR characteristic drawing of FIG. 10($c$) shows that the VSWR value decreases largely in the band of 880 MHz to 960 MHz and the peak of the VSWR value exists and thus resonance as the antenna can be observed and large improvement can be understood.

Figure 11:
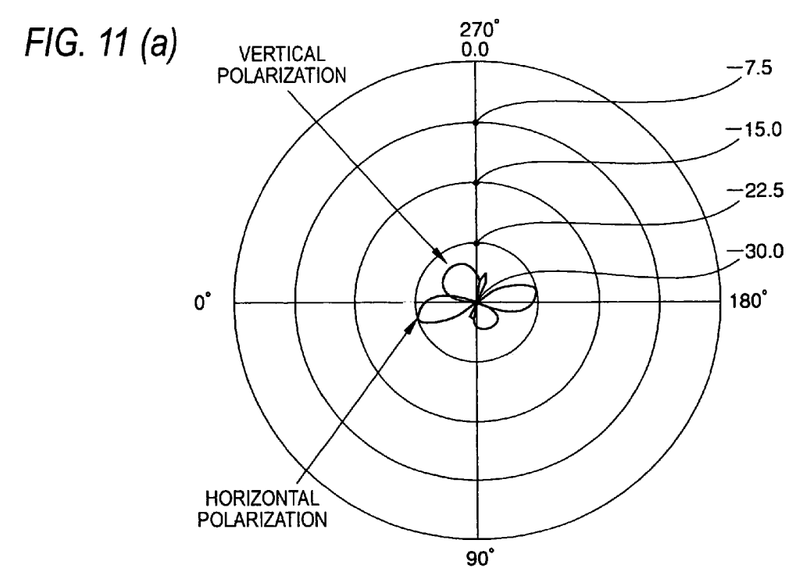
FIG. 11 is directional patterns of horizontal polarization and vertical polarization provided by (a) communication terminal in related art and (b) the communication terminal of the embodiment.

FIG. 11 is directional patterns of horizontal polarization and vertical polarization provided by (a) communication terminal in related art and (b) the communication terminal of the embodiment. The directional pattern of horizontal polarization shows the directivity of the horizontal plane when the communication terminal is placed so that an antenna becomes parallel with the horizontal plane. The directional pattern of vertical polarization shows the directivity of the horizontal plane when the communication terminal is placed so that an antenna becomes vertical to the horizontal plane. As compared with the directivity of the communication terminal in the related art in FIG. 11 ($a$), in the directivity of the communication terminal of the invention in FIG. 11 ($b$), it is seen that the directivity of horizontal polarization is largely improved in the vertical direction to the antenna and the directivity of vertical polarization is largely improved omnidirectionally.

While the invention has been described in detail with reference to the specific embodiments, it will be obvious to those skilled in the art that various changes and modifications can be made without departing from the spirit and the scope of the invention.

The present application is based on Japanese Patent Application No. 2002-324084 filed on Nov. 7, 2002, the contents of which are incorporated herein by reference.

INDUSTRIAL APPLICABILITY

As described above, a high-frequency current flows from the antenna to the board. Since a high-frequency current of an opposite phase flows through a metal plate because of the mirror image effect in a state in which the communication terminal is placed on the metal plate with the rear of the casing down, the high-frequency current flowing through the board of the communication terminal is canceled and thus the radiation of the antenna is weakened. According to the communication terminal according to the invention, in the state, the first conductor part is electrically connected to the metal plate or is short-circuited in a high-frequency manner to the metal plate and the second conductor part is connected to the GND of the board; the components perpendicular to the metal plate strengthen each other by the mirror image effect and thus the high-frequency current flowing through the top of the board flows into the second conductor part as an extension of the board, producing an electric field perpendicular to the metal plate. Thus, the antenna gain is not degraded and the reception sensitivity can be kept good. The first conductor part and the second conductor part can be installed with almost no need for changing the size or the design of the communication terminal.

The invention claimed is:

1. A mobile phone including a circuit board having a ground plane, the circuit board connected to an antenna, and the circuit board contained in a casing, the mobile phone, comprising: a first conductive part, formed of a conductor, and provided in the casing so as to be exposed from a rear face of the casing; a second conductive part, formed of a conductor, and provided in the casing so as to be exposed from a bottom face or side face of the casing and a passive element provided between the second conductive part and the ground plane of the circuit board, wherein the second conductive part is electrically connected to the ground plane of the circuit board through the passive element and to the first conductive part.

2. The mobile phone as set forth in claim 1, further comprising a conductor fitting which is provided between the second conductive part and the ground plane of the circuit board, wherein the second conductive part is electrically connected to the ground plane of the circuit board through the conductor fitting.

3. The mobile phone as set forth in claim 1, wherein the first conductive part and the second conductive part are formed in one piece.

4. The mobile phone as set forth in claim 1, wherein the second conductive part is exposed only from the bottom face of the casing.

5. The mobile phone as set forth in claim 1, wherein the first conductive part is exposed substantially flush with the rear face of the casing, and the second conductive part is exposed substantially flush with the bottom face of the casing.

6. The mobile phone as set forth in claim 1, wherein the second conductive part forms a perpendicular component with the first conductive part.

7. A mobile phone including a circuit board to which a shield case is attached on a rear face side of a casing, the circuit board connected to an antenna, and the circuit board contained in the casing, the mobile phone, comprising: a conductive board, formed of a conductor, and arranged along a rear face of the casing; and a conductor part, formed of a conductor, and provided between the rear face of the casing and the circuit board, wherein the conductor part is electrically connected to the shield case and the conductive board.

8. The mobile phone as set forth in claim 7, wherein the conductive board is arranged so as to be exposed from the rear face of the casing.

9. The mobile phone as set forth in claim 7, wherein the conductive board and the conductor part are formed in one piece.

10. A mobile phone including a circuit board having a ground plane, the circuit board connected to an antenna, and the circuit board contained in a casing, the mobile phone comprising: a first conductive part, formed of a conductor, and arranged along only a lower portion of a rear face of the casing; and a second conductive part, formed of a conductor, and provided between the rear face of the casing and the circuit board;, and a passive element provided between the second conductive part and the ground plane of the circuit board, wherein the second conductive part is electrically connected to the ground plane of the circuit board through the passive element and to the first conductive part.

11. The mobile phone as set forth in claim 10, wherein the first conductive part is provided in the casing so as to be exposed from the rear face of the casing, and wherein the second conductive part is provided in the casing so as to be exposed from a bottom face or side face of the casing.

12. The mobile phone as set forth in claim 10, further comprising a conductor fitting which is provided between the second conductive part and the ground plane of the circuit board, wherein the second conductive part is electrically connected to the ground plane of the circuit board through the conductor fitting.

13. The mobile phone as set forth in claim 10, wherein the first conductive part and the second conductive part are formed in one piece.

14. The mobile phone as set forth in claim 10, further comprising a shield case attached to the circuit board.

* * * * *